United States Patent [19]

Brignac

[11] 4,425,312

[45] Jan. 10, 1984

[54] REMOVAL OF SULFUR FROM PROCESS STREAMS

[75] Inventor: David G. Brignac, Lutcher, La.

[73] Assignee: Exxon Research and Engineering Co., Florham Park, N.J.

[21] Appl. No.: 394,719

[22] Filed: Jul. 2, 1982

[51] Int. Cl.$^3$ .............................................. B01D 53/34
[52] U.S. Cl. .................................... 423/230; 423/244; 55/73; 502/34
[58] Field of Search .................... 423/230, 244; 55/73; 252/411 S, 420

[56] References Cited

U.S. PATENT DOCUMENTS

| | | | |
|---|---|---|---|
| 2,551,905 | 5/1951 | Robinson | 423/230 |
| 3,974,256 | 8/1976 | Wheelock et al. | 423/230 |
| 4,263,020 | 4/1981 | Eberly | 55/73 X |

*Primary Examiner*—Earl C. Thomas

*Attorney, Agent, or Firm*—Llewellyn A. Proctor

[57] ABSTRACT

A process wherein water is added to a non-reactive gas stream, preferably a hydrogen or hydrogen-containing gas stream, sufficient to raise the water level thereof to from about 0.2 percent to about 50 percent, based on the total volume of the process gas stream, and the said moist gas stream is contacted, at elevated temperature, with a particulate mass of a sulfur-bearing metal alumina spinel characterized by the formula $MAl_2O_4$, wherein M is chromium, iron, cobalt, nickel, copper, cadmium, mercury, or zinc to desorb sulfur thereon. In the sulfur sorption cycle, due to the simultaneous adsorption of water and sulfur, the useful life of the metal alumina spinel for sulfur adsorption can be extended, and the sorbent made more easily regenerable after contact with a sulfur-bearing gas stream, notably sulfur-bearing wet hydrogen or wet hydrogen-rich gas streams.

10 Claims, No Drawings

REMOVAL OF SULFUR FROM PROCESS STREAMS

FIELD OF THE INVENTION

This invention relates to the removal of sulfur from process streams, especially hydrogen sulfide containing recycle hydrogen gas streams as encountered in reforming.

BACKGROUND OF THE INVENTION AND PRIOR ART

Sulfur occurs in many industrial processes, and sulfur, or sulfur containing compounds, because sulfur is a catalyst poison and is environmentally unacceptable must invariably be removed from process streams, e.g., flue gas, waste gas or recycle gas streams. This has been accomplished, e.g., by contacting the sulfur-containing process stream with a sorbent comprising a particulate oxide, hydrated oxide, or hydroxide of alumina, zinc, nickel, cobalt or the like, alone or in admixture with each other or with additional materials, e.g., alkali or alkaline earth metal oxides or the like. The quality of sorbents for sulfur removal varies considerably, and in many applications it is essential to scrub essentially all of the sulfur from the process streams.

Sulfur finds its way into a process principally via the feed, and essentially all petroleum feeds contain sulfur. Catalytic reforming, or hydroforming, is exemplary of a well-known and important process employed in the petroleum refining industry for improving the octane quality of naphthas and straight run gasolines, and it is illustrative of a process where the presence of sulfur can have a detrimental effect. Sulfur can gradually accumulate upon and poison the catalyst. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is concurrently passed sequentially through a reheat furnace and then to the next reactor of the series. The vapor effluent from the last reactor of the series is a gas rich in hydrogen, which usually contains small amounts of normally gaseous hydrocarbons, and it is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. Conventional reforming catalysts have thus long employed platinum composited with an inorganic oxide base, particularly alumina, and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Halogen, e.g., chlorine, is generally added to enhance the acid function required of the catalyst.

The principal reactions produced in reforming are: (1) dehydrogenation of naphthenes to produce the corresponding aromatic hydrocarbons, e.g., methylcyclohexane is dehydrogenated to form toluene, (2) isomerization of n-paraffins to form branched-chain paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking high molecular weight feed constituents to form lower molecular weight, or lower boiling, constituents, e.g., the cracking of n-decane to produce $C_3$ and $C_7$ hydrocarbons. The net effect of these reactions is to increase the concentration of aromatics and isomers, with consequent octane improvement of naphthas boiling within the gasoline range.

In use of the more recently developed polymetallic platinum catalysts wherein an additional metal, or metals, component is added as a promoter to the platinum, it has become essential to reduce the feed sulfur to only a few parts, per million parts by weight of feed (ppm), because of the sulfur sensitiveness of these catalysts. For example, in the use of platinum-iridium and platinum-rhenium catalysts it is generally necessary to reduce the sulfur concentration of the feed well below about 10 ppm, and preferably well below about 2 ppm, to avoid excessive loss of catalyst activity and $C_5+$ liquid yield. Generally, adequate sulfur can be removed from such feeds by hydrofining; hydrofining being followed by passage of the hydrofined product through guard chambers packed with metal oxides, e.g., nickel or cobalt oxide, to remove residual amounts of sulfur from the hydrofined product.

The sulfur must also be scrubbed from the hydrogen recycle stream because this too is a source of catalyst sulfur contamination. The vapor effluent from the last reactor of the series is thus a gas rich in hydrogen, which can contain hydrogen chloride, chlorine, hydrogen sulfide, moisture and small amounts of normally gaseous hydrocarbons. It is essential to separate hydrogen from the $C_5+$ liquid product and recycle it to the process; and it is essential to remove the sulfur from the recycle hydrogen gas stream.

An admirably useful sorbent for the removal of sulfur from hydrogen recycle gas streams is disclosed in U.S. Pat. No. 4,263,020 which issued Apr. 21, 1981, to Paul E. Eberly, Jr. The sorbent disclosed therein is constituted of a particulate mass of metal alumina spinel, $MAl_2O_4$, wherein M is chromium, iron, cobalt, nickel, copper, cadmium, or mercury, particularly zinc alumina spinel, $ZnAl_2O_4$. In a preferred operation, a particulate mass of metal alumina spinel, notably the zinc alumina spinel, is charged, or packed into a guard chamber, or series of guard chambers. Suitably the series of metal alumina spinel guard chambers are employed in parallel, this permitting active use of one guard chamber, or set of serially aligned guard chambers for contact, and purification of the recycle hydrogen stream while the other guard chamber, or set of serially aligned guard chambers, is cut out of series for regeneration. In the treatment of a hydrogen recycle gas stream, as employed in reforming, it is found that the hydrogen sulfide can be readily adsorbed from the stream despite the high moisture content of the gas which typically contains up to about 50 vppm (parts per million, based on volume) hydrogen chloride and water, and up to about 25 vppm hydrogen sulfide. Moreover the metal alumina spinel, or zinc alumina spinel, is readily regenerated by simply purging, or sweeping the sulfur compound therefrom with a hot, non-reactive, or inert gas, e.g., hydrogen, or hydrogen-containing gas, after the zinc spinel has become sufficiently saturated with the sulfur compound. The zinc alumina spinel, is simply contacted, purged, or swept with, e.g., the hydrogen gas stream at elevated temperature ranging from about 300° F. to about 1200° F., or preferably from about 500° F. to about 1000° F., to remove the hydrogen sulfide, and other sulfur compounds, and thereby regenerate the zinc alumina spinel.

Albeit, this process has performed admirably, i.e., is regenerable and has provided surface breakthrough capacities many times greater than conventional sorbents, it is nonetheless desirable to further improve the sulfur capacity of the metal alumina spinel sorbents.

DESCRIPTION OF THE INVENTION

It is, accordingly, the primary objective of this invention to provide a new and further improved process, or mode of operation, which will provide yet greater sorbent sulfur capacities in the use of metal alumina spinels of the class described, notably zinc alumina spinel.

A particular object is to provide a process for the regeneration of said class of metal alumina spinels, notably zinc alumina spinel, to improve their long range sulfur adsorptive capacity, especially the hydrogen sulfide adsorption capacity for subsequent use in the removal of sulfur from gas recycle streams especially hydrogen recycle streams such as used in reforming.

These objects and others are achieved in accordance with the present invention, embodying a process wherein water, or moisture, is added to a non-reactive or inert gas stream, preferably a hydrogen or hydrogen-containing gas stream, sufficient to raise the water level thereof to from about 0.2 percent to about 50 percent, preferably from about 2 percent to about 15 percent, based on the total volume of the process gas stream, and the said moist gas stream is contacted, at elevated temperature, with a particulate mass of a sulfur-bearing metal alumina spinel characterized by the formula MAl$_2$O$_4$, wherein M is chromium, iron, cobalt, nickel, copper, cadmium, mercury, or zinc to desorb sulfur thereon. In the sulfur sorption cycle, due to the simultaneous adsorption of water and sulfur, the useful life of the metal alumina spinel, notably the zinc alumina spinel, sorbent for sulfur adsorption can be extended, and the sorbent made more easily regenerable after contact with a sulfur-bearing gas stream, notably sulfur-bearing wet hydrogen or wet hydrogen-rich gas streams.

In the Eberly patent, supra, the competitive adsorption of water and hydrogen sulfide by various classes of sorbents was discussed, the presence of water adversely affecting the sulfur adsorption capacity of most sorbents. The affinity of this class of spinels, notably zinc alumina spinel, for both water and hydrogen sulfide is unusual. It is disclosed in the Eberly patent that in the treatment of a sulfur-containing hydrogen recycle stream, as employed in reforming the hydrogen sulfide can be readily adsorbed from the stream dispite the high moisture content of the gas; a mildly surprising feature because of the adverse affect caused by water on the adsorption capacity of most other sorbents. The present invention is based on the further discovery that the addition of water to hot regeneration gas for use in desorption of the sulfur from the spinel sorbents will prolong the useful life of the spinel sorbents over the long run for sulfur adsorption. It is also believed that the simultaneous adsorption of relatively large amounts of water, and sulfur, during the sulfur adsorption cycle will, over the normal life of the sorbent, provide far greater sorbent sulfur capacity than, e.g., is possible in the use of the sorbent utilized for the adsorption of sulfur from sulfur-bearing process gas streams which contain relatively smaller amounts of water, or no water at all.

Whereas there is no desire to be bound by any specific theory of mechanism, the overall mechanism on which the present invention is based is believed subject to explanation. The mechanism of the adsorption of sulfur, e.g., hydrogen sulfide, by this class of spinels appears to involve several phenomena. Hydrogen sulfide adsorbed at low temperature, it is believed, will be adsorbed via two mechanisms. Some sulfur will be weakly absorbed (comparable to physical adsorption) while some hydrogen sulfide will be strongly adsorbed as in chemisorption. When regeneration is begun, the weakly adsorbed hydrogen sulfide will be quickly and relatively easily desorbed, particularly as the temperature increases. However, the strongly adsorbed hydrogen sulfide remains fixed on the surface sites of the spinel. As the temperature is increased further, some of the strongly adsorbed hydrogen sulfide will irreversibly react with the spinels, perhaps incorporating sulfur into the lattice structure of the spinels. The literature is found to disclose that mixed metal oxide structures such as spinels can react with hydrogen sulfide at high temperatures to form mixed sulfides, e.g.,

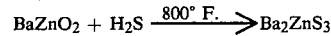

$$BaZnO_2 + H_2S \xrightarrow{800° F.} Ba_2ZnS_3$$

During the course of many adsorption/desorption cycles, it is believed that a significant amount of sulfur becomes distributed throughout the spinel lattice structure. It has now been learned experimentally that, e.g., over 20 absorption/desorption cycles, the sulfur saturation capacity of zinc alumina spinel dropped (3.2 wt.% to 0.9 wt.%), while simultaneously, the sulfur content of the zinc alumina spinel increased (0.2 wt.% to 6 wt.%) generally proportionately. Hence, despite possible lowered sulfur capacity of the spinel sorbents in the sulfur adsorption cycle, short term, due to competitive adsorption of water and hydrogen sulfide, simultaneous adsorption of adequate amounts of water, and hydrogen sulfide, along with regeneration, preferably in wet hydrogen or a wet hydrogen-rich atmosphere, will prolong the useful life of the spinel sorbent. In the long-run a spinel sorbent employing simultaneous adsorption of water and hydrogen sulfide in the sulfur sorption cycle will have a greater sulfur capacity than one utilizing relatively small amounts of water, or only hydrogen sulfide to the virtual exclusion of water. Since the recycle gas drier is, or can be operated at low temperature, adsorption of water can be made essentially physical. Adsorption of water serves to protect sites that could form irreversible species with hydrogen sulfide. Upon heating at controlled conditions during regeneration, these physically adsorbed water molecules can be easily removed. Much of the hydrogen sulfide molecules that could react with the spinel sorbent during regeneration to reduce the hydrogen sulfide capacity, may also be preferentially reacted with water to form sulfur dioxide which too could then be desorbed. Water is supplied to the regeneration gas to assure that it contains adequate water. The water apparently strips or reacts with hydrogen sulfide and consequently maintains high spinel sorbent sulfur capacity.

In conducting the sulfur sorption portion of the operating cycle, a particulate mass of the metal alumina spinel is contacted with the sulfur-bearing process stream at temperatures ranging from about 20° F. to about 450° F., preferably from about 50° F. to about 300° F., and the sulfur thereby adsorbed onto the particulate mass. Preferably, the sulfur-bearing process stream, notably recycle hydrogen as employed in reforming, is one which contains or to which additional water is added to provide from about 5 parts to about 200 parts, preferably from about 50 parts to about 100 parts, per million parts by volume of total gas. The temperature of the sulfur-bearing process gas stream is maintained at from about 20° F. to about 450° F., preferably from about 50° F. to about 300° F.

Water is added to the non-reactive or inert regeneration gas, as suggested, sufficient to provide from about 0.2 percent to about 50 percent, preferably from about 2 percent to about 15 percent water, based on the total volume of the gas. In the regeneration phase of the overall cycle of operation, the particulate mass of sulfur-bearing metal alumina spinel is contacted with the wet regeneration gas at temperatures ranging from about 350° F. to about 1000° F., preferably from about 450° F. to about 600° F. Temperature above about 600° F. should be avoided to minimize replacement of lattice oxygen of the spinel by sulfur.

In a preferred mode of operating a reformer, a hydrogen recycle gas drier, e.g., a guard chamber containing a bed of drying agent such as a molecular sieve, is placed downstream of guard chamber containing a bed of the metal alumina spinel sorbent. Wet recycle gas from the last reactor of the series, or wet recycle gas to which additional water is added, is first contacted with the metal alumina spinel sorbent and sulfur adsorbed at the specified sulfur adsorption conditions, while in a parallel guard bed a sulfur-bearing metal alumina spinel sorbent is regenerated at the specified sulfur desorption conditions. The sulfur denuded recycle hydrogen from the guard chamber operated in the sulfur sorption mode is serially passed through the hydrogen recycle gas drier, dried, and the dry hydrogen then recycled to the lead reactor of the series.

The invention will be more fully understood by reference to the following examples, with comparative data illustrating its more salient features. The effectiveness of wet hydrogen regeneration of a portion of a sulfur-containing zinc alumina spinel sorbent is compared with regeneration of a similar sorbent with essentially pure, dry hydrogen.

EXAMPLES

1. For comparative purposes, a first series of standard regeneration runs, or runs made by desorption with dry hydrogen as employed in prior art practice, were made. This procedure employed in a single sulfur sorption/desorption cycle is described, as follows:

Fifty grams of zinc alumina spinel was charged to a small isothermal plug flow reactor. The zinc alumina spinel was pretreated initially by heating to 1000° F. in 100% hydrogen for 18 hours.

Following the hydrogen pretreatment, the reactor was then cooled and, to begin the sorption cycle, adsorption of $H_2S$ was begun at the following set of conditions, to wit:

| Sulfur Adsorption Conditions | |
|---|---|
| Gas | 2000 vppm $H_2S$—$H_2$ blend |
| Flow | 200 liter/hours |
| Temp | 150° F. |
| Pressure | 0 psig |

The $H_2S$—$H_2$ blend was cut out immediately after $H_2S$ breakthrough.

Dry hydrogen regeneration to desorb sulfur from the zinc alumina spinel was then conducted in accordance with the following outlined procedure, to wit:

| Dry Hydrogen Regeneration |
|---|
| 1. 100% hydrogen was then cut in to the reactor |
| 2. Heating from 150° F. to 600° F. was begun. |
| 3. The temperature was then held at 600° F. for 2 hours. |
| 4. The reactor was then cooled down to 150° F. |

The sulfur adsorption/desorption cycle then repeated over six additional cycles without any further hydrogen pretreatment.

2. In a second series, a series of wet hydrogen regeneration runs, 50 grams of zinc alumina spinel was again charged to a small isothermal plug flow reactor, and the zinc alumina spinel again pretreated, in the initial portion of the first cycle only, with hydrogen at 1000° F. A sulfur sorption/desorption cycle is defined as follows:

Water was then issued into the reactor in the adsorption portion of the operating cycle during the initial four cycles, i.e., Cycle 1-4, of an eight cycle operation. In conducting the last four cycles (i.e., Cycles 5-8) no water was added to the reactor during adsorption. Water was added only during the regeneration phase.

In initiating these series of runs, in Cycles 1-4 therefore, hydrogen containing 2.5 volume percent $H_2O$ was issued into the reactor for 2 minutes at a rate of 200 l/hr, prior to adsorption of $H_2S$. A fraction of the effluent was diverted through an $H_2S$ Draeger tube, the $H_2S$ on breakthrough reacting with the white material inside the tube to change it from white to brown. $H_2S$ breakthrough was defined as the point when any brown color was first detected.

The $H_2S$—$H_2$ blend was cut out of the reactor immediately after $H_2S$ breakthrough, and just prior to wet hydrogen regeneration. Regeneration to desorb sulfur from the zinc alumina spinel after each of the sulfur sorption cycles with wet zinc alumina spinel was carried out as follows:

| Wet Hydrogen Regeneration |
|---|
| 1. A 2.5% $H_2O$—$H_2$ blend was cut in to the reactor. |
| 2. Heating 150° F. to 600° F. was begun. |
| 3. The temperature was held at 600° F. for 2 hours. |
| 4. The saturator was removed to let dry hydrogen pass over the zinc alumina spinel. |
| 5. The reactor was cooled down to 150° F. |

The sulfur sorption/desorption cycle was then repeated over seven additional cycles, without any further hydrogen pretreatment; and subject to the conditions specified for Cycles 1-4 and Cycles 5-8.

These data show that the amount of sulfur adsorbed during the initial cycles (Cycles 1-4) of the wet hydrogen regeneration run was lower than in the dry hydrogen regeneration run This was due to the 2 minute period of exposure to the 2.5% H₂O—H₂ blend prior to H₂S adsorption in the case of wet hydrogen regeneration It appeared that H₂S adsorption capacity reached a stable state after four cycles with both methods of regeneration. An average sulfur breakthrough capacity was calculated by taking the mean of the sulfur capacities for all cycles after completing of the fourth cycle for both methods of regeneration. Using as a basis of calculation, a total of seven cycles for the dry hydrogen regeneration runs with eight cycles for the wet hydrogen regeneration runs, as can be seen by reference to the Table below, the zinc alumina spinel undergoing wet hydrogen regeneration showed a higher average sulfur capacity than the zinc alumina spinel undergoing dry hydrogen regeneration. Because of an expected lower rate of irreversible sulfur reaction occurring during wet hydrogen regeneration, compared to dry hydrogen regeneration, the sulfur breakthrough capacity credit for wet hydrogen regeneration increases as the number of adsorption/desorption cycles increases.

TABLE

Comparison of Wet and Dry Hydrogen Regeneration For Zinc Alumina Spinel

| Regeneration Method | Average Sulfur Breakthrough Capacity, Weight Percent |
|---|---|
| Dry Hydrogen | 0.35 |
| Wet Hydrogen | 0.39 |

It is apparent that various minor modification and changes can be made without departing the spirit and scope of the present invention.

Having described the invention, what is claimed is:

1. In a process for the removal of sulfur from a moisture containing process gas stream which includes a sulfur sorption portion of an operating cycle wherein said stream is contacted with a metal alumina spinel sorbent characterized by a formula $$MAl_2O_4$$

wherein M is chromium, iron, cobalt, nickel, copper, cadmium, mercury, or zinc, to adsorb both water and sulfur, and
   a sulfur desorption portion of an operating cycle wherein said sulfur-bearing metal alumina spinel sorbent is contacted with a non-reactive gas to desorb sulfur and regenerate said sorbent,
the improvement comprising
   adding water to the non-reactive gas sufficient to provide a moisture level ranging from about 0.2 percent to about 50 percent, based on the total volume of the non-reactive gas stream.

2. The process of claim 1 wherein the moisture level of the non-reactive gas ranges from about 2 percent to about 15 percent.

3. The process of claim 1 wherein the temperature of the non-reactive gas during contact with the metal alumina spinel sorbent ranges from about 350° F. to about 1000° F.

4. The process of claim 1 wherein the moisture level of the non-reactive gas ranges from about 2 percent to about 15 percent, and the temperature of the non-reactive gas during contact with the metal alumina spinel sorbent ranges from about 350° F. to about 1000° F.

5. The process of claim 1 wherein the metal alumina spinel sorbent is zinc alumina spinel.

6. In a process for the removal of sulfur from a moisture bearing process gas stream which includes
   a sulfur sorption portion of an operating cycle wherein said stream is contacted with a zinc alumina spinel sorbent to adsorb both water and sulfur, and
   a sulfur desorption portion of an operating cycle wherein said sulfur-bearing zinc alumina spinel sorbent is contacted with a non-reactive gas to desorb sulfur and regenerate said zinc alumina spinel sorbent,
the improvement comprising
   adding water to the non-reactive gas sufficient to provide a moisture level ranging from about 0.2 percent to about 50 percent, based on the total volume of the non-reactive gas stream.

7. The process of claim 6 wherein the moisture level of the non-reactive gas ranges from about 2 percent to about 15 percent.

8. The process of claim 6 wherein the temperature of the non-reactive gas during contact with the zinc alumina spinel sorbent ranges from about 350° F. to about 1000° F.

9. The process of claim 6 wherein the moisture level of the non-reactive gas ranges from about 2 percent to about 15 percent, and the temperature of the non-reactive gas during contact with the zinc alumina spinel sorbent ranges from about 350° F. to about 1000° F.

10. In a process for the removal of sulfur from a sulfur containing process stream wherein a series of on-stream reactors are provided with beds of a sulfur sensitive platinum-containing catalyst, a naphtha feed with hydrogen is cocurrently passed sequentially through said series of reactors, a vaporous effluent rich in hydrogen is taken from the last reactor of the series, and hydrogen is separated from the products, recycled and contacted in a sulfur sorption portion of an operating cycle with a metal alumina spinel sorbent characterized by a formula $$MAl_2O_4$$

wherein M is chromium, iron, cobalt, nickel, copper, cadmium, mercury, or zinc, to adsorb both water and sulfur, and
   wherein said sulfur-bearing metal alumina spinel sorbent is contacted in a sulfur desorption portion of an operating cycle with a non-reactive gas to desorb sulfur and regenerate said sorbent,
the improvement comprising
   adding water to the non-reactive gas sufficient to provide a moisture level ranging from about 0.2 percent to about 50 percent, based on the total volume of the non-reactive gas stream.

* * * * *